(12) United States Patent
Kaji et al.

(10) Patent No.: US 8,546,510 B2
(45) Date of Patent: Oct. 1, 2013

(54) CRYSTALLINE RESIN CURED PRODUCT, CRYSTALLINE RESIN COMPOSITE MATERIAL, AND METHOD FOR PRODUCING THE SAME

(75) Inventors: Masashi Kaji, Kitakyushu (JP); Koichiro Ogami, Kitakyushu (JP); Kazuhiko Nakahara, Kitakyushu (JP); Tomomi Fukunaga, Kitakyushu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 288 days.

(21) Appl. No.: 12/312,369
(22) PCT Filed: Nov. 8, 2007
(86) PCT No.: PCT/JP2007/071737
§ 371 (c)(1), (2), (4) Date: May 7, 2009
(87) PCT Pub. No.: WO2008/059755
PCT Pub. Date: May 22, 2008

(65) Prior Publication Data
US 2010/0016473 A1 Jan. 21, 2010

(30) Foreign Application Priority Data
Nov. 13, 2006 (JP) .................. 2006-306520

(51) Int. Cl.
C08G 59/00 (2006.01)
C08G 65/38 (2006.01)
C08G 59/50 (2006.01)
C08L 63/00 (2006.01)

(52) U.S. Cl.
USPC ................ 528/87; 523/400; 528/97; 528/98; 528/219

(58) Field of Classification Search
USPC ....................................... 523/400
See application file for complete search history.

(56) References Cited

U.S. PATENT DOCUMENTS
2,506,486 A * 5/1950 Bender et al. ................. 528/104
5,218,062 A * 6/1993 Earls et al. .................... 525/526
(Continued)

FOREIGN PATENT DOCUMENTS
JP 07-090052 A 4/1995
JP 09-118673 A 5/1997
(Continued)

OTHER PUBLICATIONS
English machine translation of JP 2001-026633 A, Kaji et al, Jan. 30, 2001.*
(Continued)

*Primary Examiner* — Peter F Godenschwager
*Assistant Examiner* — David Karst
(74) *Attorney, Agent, or Firm* — Edwards Wildman Palmer LLP; James E. Armstrong, IV; Nicholas J. DiCeglie, Jr.

(57) ABSTRACT

Provided are a crystalline resin cured product which shows high thermal conductivity, low thermal expansion, high heat resistance, low moisture absorption, and good gas barrier properties and a crystalline resin composite material produced therefrom. Further provided is a method for producing the crystalline resin cured product and the crystalline resin composite material. The crystalline resin cured product is obtained by the reaction of an aromatic diglycidyl compound or a diglycidyl resin with an aromatic dihydroxy compound or with a dihydroxy resin and it shows a heat of melting of 10 J/g or more in differential thermal analysis while the endothermic peak corresponding to the melting appears in the range of 120 to 320° C. The crystalline resin composite material is obtained by combining the crystalline resin cured product with a filler or a base material. The crystalline resin cured product has a unit represented by $-A-O-CH_2-CH(OH)-CH_2-O-B-$, wherein A and B are divalent aromatic groups.

11 Claims, 2 Drawing Sheets

(56) References Cited

U.S. PATENT DOCUMENTS 5,834,570 A * 11/1998 Kaji et al. .................. 525/481
6,987,161 B2 * 1/2006 Schile ........................ 528/117

FOREIGN PATENT DOCUMENTS

| JP | 09-227652 A | | 9/1997 |
|----|----|----|----|
| JP | 10-139857 A | | 5/1998 |
| JP | 11-323162 A | | 11/1999 |
| JP | 2001026633 A | * | 1/2001 |
| JP | 2003327660 A | * | 11/2003 |
| JP | 2004-123847 A | | 4/2004 |
| JP | 2005-306955 A | | 11/2005 |
| JP | 2005-325231 A | | 11/2005 |
| JP | 2007-039551 A | | 2/2007 |
| WO | WO-98/01494 A1 | | 1/1998 |
| WO | WO-2006/008984 A1 | | 1/2006 |

OTHER PUBLICATIONS

Kaji et al., Machine generated English translation of JP 2003-327660 A, Nov. 19, 2003.*

International Search Report dated Jan. 29, 2008, issued on PCT/JP2007/071737.

Notification of Transmittal of Translation of the International Preliminary Report on Patentability dated Aug. 6, 2009 (1 page).

English Translation of the International Preliminary Report on Patentability dated Aug. 6, 2009 (9 pages).

* cited by examiner

CRYSTALLINE RESIN CURED PRODUCT, CRYSTALLINE RESIN COMPOSITE MATERIAL, AND METHOD FOR PRODUCING THE SAME

FIELD OF TECHNOLOGY

This invention relates to a crystalline resin cured product which shows high thermal conductivity, low thermal expansion, high heat resistance, low moisture absorption, and good gas barrier properties, to a crystalline resin composite material obtained therefrom, and to a method for producing the crystalline resin cured product and the crystalline resin composite material.

BACKGROUND TECHNOLOGY

In recent years, technological innovations such as higher densification of semiconductor packages and development of integrated circuits with a larger scale of integration than LSI and high-speed integrated circuits are made in the fields of electronic instruments and dissipation of heat thereby generated presents a theme of extreme importance. One of the measures currently under investigation for dissipating heat is application of heat-conductive articles molded from heat-dissipating materials such as metals, ceramics, and polymer compositions to the heat-dissipating parts such as printed circuit wiring boards, semiconductor packages, box-shaped housings, heat sinks, and heat dissipation sheets.

Of the aforementioned heat-dissipating materials, heat-conductive cured epoxy resins have excellent properties in respect to electrical insulation, mechanical properties, heat resistance, chemical resistance, adhesiveness, and density and are used widely in the electrical and electronic fields as cast articles, laminated sheets, encapsulants, adhesives, and the like.

Epoxy resin compositions containing fillers of high thermal conductivity are known to yield heat-conductive cured products, but none of the cured products obtained thus far from the conventional epoxy resins shows sufficient thermal conductivity.

Some of epoxy resin compositions known for excellent thermal conductivity contain epoxy resins having a mesogenic structure. For example, JP7-90052 A describes an epoxy resin composition containing a biphenol type epoxy resin and a curing agent based on a polyhydric phenol resin as essential components and the document discloses that the composition shows good stability and high strength at high temperatures and is useful for a wide variety of applications such as adhesion, casting, encapsulation, molding, and lamination. Further, JP9-118673 A discloses an epoxy compound having two mesogenic structures linked by a bent chain in the molecule. Still further, JP11-323162 A discloses a resin composition which contains an epoxy resin having a mesogenic group.

Patent document 1: JP7-90052 A
Patent document 2: JP9-118673 A
Patent document 3: JP11-323162 A
Patent document 4: JP2004-123847 A
Patent document 5: JP2005-325231 A
Patent document 6: JP2005-306955 A The cured products obtained from the aforementioned epoxy compounds having a mesogenic structure are optically anisotropic and some of them have been confirmed to manifest the properties of liquid crystals with a domain size of from several μm to several tens of μm, but none has not gone so far as to form a crystal phase with a domain size of several hundreds of μm. In consequence, the cured products obtained from conventional epoxy resins having a mesogenic structure are anisotropic on a micro scale, but they are isotropic on a macro scale; hence, they are optically transparent when visually observed. Moreover, a distinct endothermic peak attributable to melting of the crystal phase is not observed in differential thermal analysis. That is to say, the cured products obtained from the epoxy resins having a mesogenic structure reported thus far show insufficient growth of the crystal phase and they fail to be sufficiently effective for providing high thermal conductivity, low thermal expansion, high heat resistance, low moisture absorption, and good gas barrier properties. Furthermore, because of insufficient growth of crystals in the said cured products, their heat resistance depends on glass transition temperature and high heat resistance attributable to melting of the crystal phase cannot be expected.

Resin compositions of high crystallinity proposed thus far include a resin composition containing an aromatic polyester disclosed in JP2005-325231 A and a resin composition formulated from a polyarylene sulfide resin and a liquid crystal polymer such as an aromatic polyester disclosed in JP2005-306955 A. However, liquid crystal polymers such as aromatic polyesters are highly viscous and show poor moldability. Moreover, high viscosity limits the manipulating latitude in combining the polymer with an inorganic filler in the production of a composite material.

DISCLOSURE OF THE INVENTION

Problems to be Solved by the Invention

An object of this invention is to provide a crystalline resin cured product which shows high thermal conductivity, low thermal expansion, high heat resistance, low moisture absorption, and good gas barrier properties. Another object of this invention is to provide a crystalline resin composite material using the said crystalline resin cured product. A further object of this invention is to provide a method for producing the said crystalline cured resin and crystalline resin composite material.

Means to Solve the Problems

The inventors of this invention have conducted intensive studies on resins having a variety of main backbones, found the following singular phenomenon, and completed this invention: that is, it is not always necessary for a cured resin to have a main backbone having a mesogenic structure such as the one disclosed in the patent documents 2 and 3 in order for it to crystallize and a composition containing a resin obtained by the reaction of an aromatic diglycidyl compound (including a diglycidyl resin) of a specified structure that shows excellent symmetry and causes minimal steric hindrance with an aromatic dihydroxy compound (including a dihydroxy resin) of a similarly specified structure continues to crystallize with high crystallinity even after curing.

Accordingly, this invention relates to a crystalline resin cured product which is characterized in that the crystalline resin cured product contains a unit represented by the following general formula (1) up to 30 wt % or more of the whole and, when analyzed by differential scanning calorimetry, the crystalline cured product absorbs a heat quantity of 10 J/g or more calculated on the basis of the resin components of the crystalline resin cured product as the crystals of the crystal line resin cured product melt and the endothermic peak appears in the range of 120 to 320° C.:

(1)

in general formula (1), A and B are divalent aromatic groups and they may be identical with or different from each other.

Further, this invention relates to the aforementioned crystalline resin cured product wherein the crystalline resin cured product contains a unit represented by the following general formula (2) up to 50 wt % or more of the whole:

(2)

in general formula (2), A and B are divalent aromatic groups and they may be identical with or different from each other.

The main component of the aforementioned crystalline resin cured product is preferably obtained by the reaction of an aromatic diglycidyl compound with an aromatic dihydroxy compound.

Further, the aforementioned aromatic diglycidyl compound or aromatic dihydroxy compound or both preferably contain one kind or more of units selected from a 4,4'-diphenyl ether group, a 4,4'-diphenyl sulfide group, a 4,4'-diphenylmethane group, a 1,4-phenylene group, a 4,4'-biphenylene group, a 1,5-naphthylene group, a 2,6-naphthylene group, and a 9,10-anthracenylene group, the units being optionally substituted with a methyl group or a halogen atom or with both. More preferably, the aforementioned aromatic diglycidyl compound or aromatic dihydroxy compound or both contain a unit represented by the following general formula (3);

(3)

in general formula (3), X is a linking group selected from a direct linkage, a methylene linkage, and an ether linkage and n is an integer of 1 to 3.

Further, this invention relates to a method for producing the aforementioned crystalline resin cured product which comprises reacting an aromatic diglycidyl compound with an aromatic dihydroxy compound. It is preferable to use 2 to 100 parts by weight of an aromatic diamine compound per 100 parts by weight of the aromatic diglycidyl compound in this reaction.

Still further, this invention relates to a crystalline resin composite material produced by combining a resin with a filler or base material wherein the said composite material comprises the aforementioned crystalline resin cured product as the matrix resin. Preferably, a crystalline resin composite material comprises a filler or base material in an amount corresponding to 10 to 90 wt % of the total weight or shows a heat distortion temperature in the range of ±30° C. from the melting point of the crystalline resin cured product.

Further, this invention relates to a method for producing the aforementioned crystalline resin composite material which comprises mixing an aromatic diglycidyl compound with an aromatic dihydroxy compound and an aromatic diamine compound so that the molar ratio of the glycidyl group in the former to the sum of the active hydrogens in the latter becomes 0.8 to 1.2, combining the mixture with a filler or base material, and curing the combined mass by heating at 80° C. or above. A method which comprises using a fibrous material as a filler or base material and impregnating the fibrous material with a solution of an aromatic diglycidyl compound and an aromatic dihydroxy compound in an organic solvent to give a prepreg, and curing the prepreg by heating excels others in producing a crystalline resin composite material.

The cured product obtained from an epoxy compound having a mesogenic structure described in the patent documents 1 to 3 has no distinct melting point. Unlike this, the crystalline resin cured product of this invention has a distinct melting point owing to growth of the crystal domain. For example, growth of the crystal phase can be confirmed by the fact that an article molded from the crystalline resin cured product is opaque and colored white to brown. Further, a distinct endothermic peak attributable to melting of the crystal phase can be observed clearly in differential scanning calorimetry. Still further, when placed at a temperature above or in the vicinity of its melting point, the crystalline resin cured product of this invention softens due to a loss of the crystal phase and shows a heat distortion temperature although it does not clearly show fluidity. One of the means to prevent a crystalline resin cured product from showing fluidity is crosslinking; this will create a condition under which the molecules in the crystalline resin cured product are unable to move freely even at a temperature above the melting point. It is not necessary here that all the molecules are crosslinked and there may arise a case where crosslinked molecular chains and uncrosslinked molecular chains get intertwined to prevent display of fluidity even at a temperature above the melting point. There may arise another case where the movement of molecules is suppressed by intertwining of molecular chains even when not all the molecules have crosslinking points or by physical interaction such as steric hindrance and display of fluidity is prevented even at a temperature above the melting point. Hence, the aforementioned matter is not related to the magnitude of crosslinking density.

Now, a crystalline resin cured product that is opaque is molded into an article that is optically isotropic and shows a certain degree of light transmittance as the result of a loss of the crystal phase at a temperature above the melting point. It is possible to let the crystal phase grow again by cooling the molded article from a temperature above its melting point where the article is optically isotropic to a temperature below its melting point and the article in the meantime becomes opaque and white to brown in color. In this case, it is possible to observe again a distinct endothermic peak due to melting of the crystal phase in differential scanning calorimetry. For regrowth of the crystal phase at a temperature below the melting point, it may be necessary in some cases to select optimal annealing temperature and time according to the object resin phase.

PREFERRED EMBODIMENTS OF THE INVENTION

The crystalline cured resin product of this invention constitutes a matrix resin itself or a main component thereof in the crystalline resin composite material. In the crystalline cured resin product of this invention, a unit represented by the aforementioned general formula (1) accounts for 30 wt % or more, preferably 50 wt % or more, more preferably 70 wt % or more, of the whole.

One example of a crystalline cured resin product containing a unit represented by the aforementioned general formula (1) is provided by a crystalline cured resin product containing a unit represented by the aforementioned general formula (2). In this case, the unit represented by general formula (2) accounts for 50 wt % or more, preferably 80 wt % or more, of the whole. In general formulas (1) and (2), A and B are divalent aromatic groups and they may be identical with or different from each other.

The crystalline resin cured product of this invention is obtained advantageously by the reaction of an aromatic diglycidyl compound with an aromatic dihydroxy compound. In the case where this reaction is employed to produce a crystalline resin cured product, A in general formulas (1) and (2) is understood to be a divalent aromatic group constituting the aromatic diglycidyl compound and, likewise, B is understood to be a divalent aromatic group constituting the aromatic dihydroxy compound. The crystalline resin cured product obtained by this reaction is used occasionally below as a typical example in the explanation of this invention.

The crystalline resin cured product of this invention has a crystal phase (crystallized resin phase). The resin phase becomes turbid and shortly thereafter becomes opaque as the crystal phase comes into existence and grows and this fact can be confirmed by visual observation. The degree of growth of the crystal phase can be estimated from the absorption of heat which occurs as the crystals melt in an analysis by differential scanning calorimetry. The quantity of heat absorbed is 10 J/g or more, preferably 30 µg or more, more preferably 60 J/g or more. Although there is no upper limit to the quantity of heat absorbed, it is 200 J/g or less, preferably 150 J/g or less. A quantity of heat absorbed of less than 10 J/g reduces the effect of improving the properties toward higher thermal conductivity, lower thermal expansion, higher heat resistance, lower moisture absorption, and better gas barrier properties. Moreover, a crystalline resin cured product of high crystallinity is able to hold the strength at high temperatures as the crystallinity is maintained at a high level even when the glass transition temperature is low and is able to maintain the heat distortion temperature, which is an indicator of practical heat resistance, at a high level. The amount of the crystal phase existing in the crystalline resin cured product of this invention is roughly 10 wt % or more, preferably 30 wt % or more, more preferably 60 wt % or more. The melting point of the crystallized resin phase is in the range of 120 to 320° C., preferably in the range of 150 to 250° C. The quantity of heat absorbed here means the quantity of heat absorbed in the vicinity of the melting point determined with a differential scanning calorimeter; a sample weighing 10 mg or so was weighed out precisely and tested in a stream of nitrogen while raising the temperature at a rate of 5° C./min and the temperature at which the endothermic peak appears is taken as the melting point. In the case of a composite material comprising the crystalline resin cured product, the quantity of heat absorbed is calculated on the basis of the composite material less the filler or base material, namely, on the basis of the resin components (they typically correspond to the sum of the aromatic diglycidyl compound, aromatic dihydroxy compound, and curing accelerator in the case where the resin components alone constitute the crystalline resin cured product).

The degree of crystallinity of the crystalline resin cured product can be changed to a considerable extent by changing the conditions for the reaction of an aromatic diglycidyl compound with an aromatic dihydroxy compound. The reaction temperature is normally in the range of 60 to 250° C., but it is preferable to carry out the reaction at a temperature below the melting temperature of the crystalline resin cured product in order to raise the degree of crystallinity of a crystalline resin; normally a temperature lower than the melting point of the crystalline resin cured product by 10 to 100° C., preferably by 20 to 80° C., is selected for the reaction. The degree of crystallinity does not improve at a temperature above the melting point of the crystalline resin cured product. The reaction time ranges from 1 minute to 20 hours, preferably from 3 minutes to 12 hours, more preferably from 10 minutes to 6 hours. When the reaction is carried out in a molding machine with application of heat, the molding pressure is preferably in the range of 0.2 to 20 MPa. A vacuum press may be used to suppress generation of bubbles and voids. Further, after molding with application of heat, the degree of crystallinity can be raised more by postcure. The postcure is normally performed at a temperature in the range of 130 to 250° C. for a time in the range of 1 to 24 hours. However, the postcure is performed preferably at a temperature that is lower than the melting point or the endothermic peak temperature determined in differential scanning calorimetry by 5 to 60° C. for a time in the range of 1 to 24 hours. Since both an aromatic diglycidyl compound and an aromatic dihydroxy compound are bifunctional, the reaction of the two compounds would produce a two-dimensional polymer free of crosslinking points if it proceeds ideally. In reality, however, a glycidyl group reacts with a hydroxyl group to form a secondary alcohol and the hydroxyl group of the secondary alcohol reacts with a glycidyl group; as the result, crosslinking points are formed and this leads to the formation of a cured product that does not show fluidity even at a temperature above the melting point.

The reaction of an aromatic diglycidyl compound with an aromatic dihydroxy compound may be carried out in an organic solvent. Examples of the organic solvent include toluene, xylene, methyl ethyl ketone, methyl isobutyl ketone, dioxane, ethanol, isopropyl alcohol, Methyl Cellosolve, Ethyl Cellosolve, cyclopentanone, cyclohexanone, N,N-dimethylformamide, N,N-dimethylacetamide, and dimethyl sulfoxide, but are not limited thereto. These solvents may be used singly or as a mixture of two kinds or more. The reaction temperature normally ranges from 60° C. to the boiling point of the selected solvent and the reaction time normally ranges from 1 to 20 hours.

It is desirable to use a catalyst in the reaction of an aromatic diglycidyl compound with an organic dihydroxy compound. The reaction may be carried out by applying only heat without using a catalyst if circumstances require. In this case, however, a side reaction tends to occur and, as a result, the orientation of molecules is hindered and the degree of crystallinity of the crystalline resin cured product drops. Examples of the catalyst include amines, imidazoles, organic phosphines, and Lewis acids: concretely, the tertiary amines include 1,8-diazabicyclo(5,4,0)undecene-7, triethylenediamine, benzyldimethylamine, triethanolamine, dimethylaminoethanol, and tris(dimethylaminomethyl)phenol; the imidazoles include 2-methylimidazole, 2-phenylimidazole, 2-phenyl-4-methylimidazole, and 2-heptadecylimidazole; the organic phosphines include tributylphosphine, methyldiphenylphosphine, triphenylphosphine, diphenylphosphine, and phenylphosphine; the tetra-substituted phosphonium tetra-substituted borates include tetraphenylphosphonium tetraphenylborate, tetraphenylphosphonium ethyltriphenylborate, and tetrabutylphosphonium tetrabutylborate; and the tetraphenylboronates include 2-ethyl-4-methylimidazole tetraphenylborate and N-methylmorpholine tetraphenylborate. The catalyst is normally added at a rate of 0.2 to 10 parts by weight to 100 parts by weight of the aromatic diglycidyl compound.

The essential requirement for an aromatic diglycidyl compound is the presence of two glycidyl groups in the molecule. For example, it may be a material that is named an aromatic diglycidyl compound and is substantially composed of a single component with a purity of 95 wt % or more; it may be a mixture of isomers; or it may be a material that should be designated as an aromatic diglycidyl resin having a molecular weight distribution. However, a polymer resulting from the reaction of an aromatic diglycidyl compound with an aromatic dihydroxy compound needs to crystallize and the main skeleton of the diglycidyl component, namely, the main skeleton of an aromatic diglycidyl compound less its functional groups (glycidyl groups) preferably shows excellent symmetry and causes minimal steric hindrance.

An aromatic diglycidyl compound is represented preferably by the following general formula (4):

(4)

wherein, A is a divalent aromatic group, one A may be identical with or different from another A, and n is a number of 0 or more.

An aromatic diglycidyl compound represented by general formula (4) or the target is obtained by the reaction of an aromatic dihydroxy compound with epichlorohydrin or with another aromatic diglycidyl compound having a lower molecular weight than that of the target.

In the following account of the synthesis of an aromatic diglycidyl compound represented by general formula (4), an aromatic dihydroxy compound to be used in the synthesis is referred to as a dihydroxy compound and an aromatic diglycidyl compound having a low molecular weight is referred to as a diglycidyl compound.

The reaction of a dihydroxy compound with epichlorohydrin can be carried out as in an ordinary epoxidation reaction. For example, a dihydroxy compound is dissolved in an excess of epichlorohydrin and the solution is allowed to react in the presence of an alkali metal hydroxide such as sodium hydroxide and potassium hydroxide at a temperature in the range of 50 to 150° C., preferably in the range of 60 to 100° C., for a time of 1 to 10 hours. The amount of the alkali metal hydroxide is 0.8 to 1.2 moles, preferably 0.9 to 1.0 mole, per 1 mole of the hydroxyl group in the dihydroxy compound. Epichlorohydrin is used in excess of the hydroxyl group in the dihydroxy compound, normally 1.2 to 15 moles of epichlorohydrin per 1 mole of the hydroxyl group in the dihydroxy compound. Upon completion of the reaction, the excess epichlorohydrin is distilled off, the residue is dissolved in a solvent such as toluene and methyl isobutyl ketone, and the solution is filtered, washed with water to remove inorganic salts, and stripped of the solvent by distillation to give the target aromatic diglycidyl compound.

In the aforementioned general formula (4), n is a nonnegative integer and the value of n can be controlled easily by changing the molar ratio of the dihydroxy compound to epichlorohydrin or to the selected glycidyl compound. The mean value of n is preferably in the range of 0.1 to 10.0. A mean value larger than this raises the viscosity and makes handling of the compound more difficult.

The essential requirement of a dihydroxy compound to be used in the aforementioned reaction is the presence of two or more hydroxyl groups in the molecule. However, the dihydroxy compound is first converted to an aromatic diglycidyl compound and then submitted to the reaction with an aromatic dihydroxy compound to yield a polymer and, since the polymer needs to crystallize, the candidate dihydroxy compound preferably shows excellent symmetry and causes minimal steric hindrance. Examples of the dihydroxy compound include 4,4'-dihydroxydiphenylmethane, 3,3',5,5'-tetramethyl-4,4'-dihydroxydiphenylmethane, 4,4'-dihydroxydiphenyl sulfone, 4,4'-dihydroxydiphenyl ether, 1,4-bis(4-hydroxyphenoxy)benzene, 1,3-bis(4-hydroxyphenoxy)benzene, 4,4'-bis(4-hydroxyphenoxy)diphenyl ether, 3,3'-bis(4-hydroxyphenoxy)diphenyl ether, 3,3'-bis(3-hydroxyphenoxy)diphenyl ether, 4,4'-dihydroxydiphenyl sulfide, 4,4'-dihydroxydiphenyl ketone, 4,4'-dihydroxybiphenyl, 3,3',5,5'-tetramethyl-4,4'-dihydroxybiphenyl, hydroquinone, 1,4-dihydroxynaphthalene, 1,5-dihydroxynaphthalene, 2,6-dihydroxynaphthalene, 2,7-dihydroxynaphthalene, 4,4'-bis(4-hydroxybenzyl)biphenyl, and 9,10-bis(4-hydroxybenzyl)anthracene. Of these compounds, preferable are 4,4'-dihydroxydiphenyl ether, 1,4-bis(4-hydroxyphenoxy)benzene, 4,4'-dihydroxydiphenyl sulfide, 4,4'-dihydroxybiphenyl, 4,4'-dihydroxydiphenylmethane, 1,4-dihydroxybenzene, 1,5-dihydroxynaphthalene, 2,6-dihydroxynaphthalene, 4,4'-bis(4-hydroxybenzyl)biphenyl, and 9,10-bis(4-hydroxybenzyl)anthracene. Particularly preferable are 4,4'-dihydroxydiphenyl ether, 4,4'-dihydroxydiphenylmethane, and 4,4'-dihydroxybiphenyl. These dihydroxy compounds may contain a small amount of isomers that have the functional groups located at the positions different from the ones specified above, but any of the dihydroxy compounds selected for use in the reaction contains preferably 90 wt % or more, more preferably 95 wt % or more, particularly preferably 98 wt % or more, of the structure specified above. A dihydroxy compound with a content of the specified structure lower than this causes a drop in crystallinity when it is converted to a polymer.

Two kinds or more of aromatic diglycidyl compounds may be used together in the production of a crystalline resin cured product according to this invention. Examples of a preferable combination of two kinds of aromatic diglycidyl compounds in this case are the following: one is a combination of an aromatic diglycidyl compound derived from 4,4'-dihydroxydiphenylmethane and an aromatic diglycidyl compound derived from 4,4'-dihydroxybiphenyl and another is a combination of an aromatic diglycidyl compound derived from 4,4'-dihydroxydiphenyl ether and an aromatic diglycidyl compound derived from 4,4'-dihydroxybiphenyl. A polymer produced by using these combinations possesses a high degree of crystallinity and a high melting point and are expected to display excellent heat resistance.

The epoxy equivalent of an aromatic diglycidyl compound is normally in the range of 160 to 60,000. In applications to laminated sheets and the like, the epoxy equivalent is preferably in the range of 400 to 40,000 from the viewpoint of providing film-forming ability and flexibility. On the other hand, in applications to molding materials, the epoxy equivalent is preferably in the range of 160 to 1,000 from the viewpoint of securing packing of fillers at high content and good moldability. In the case where two kinds or more of aromatic diglycidyl compounds are used together, it is preferable for the said compounds to satisfy the aforementioned criteria for the epoxy equivalent. In this case, the epoxy equivalent is computed by dividing the total weight in grams of the compounds by the number of moles of the glycidyl groups in them.

As for the purity of an aromatic diglycidyl compound, the content of hydrolyzable chlorine is kept as low as possible from the viewpoint of enhancing reliability. Although it is not limited to any specific value, it is preferably kept at 1,000 ppm or less, more preferably at 500 ppm or less. The content of hydrolyzable chlorine here means the value determined by the following method: 0.5 g of a sample is dissolved in 30 ml of dioxane, 10 ml of 1N KOH is added, and the resulting solution is boiled under reflux for 30 minutes and then cooled to room temperature; 100 ml of 80% acetone water is added and potentiometric titration is conducted using 0.002N $AgNO_3$ solution.

The essential requirement for an aromatic dihydroxy compound to be used for the production of a crystalline resin cured product according to this invention is the presence of two hydroxyl groups in the molecule. For example, it may be a material that is named an aromatic dihydroxy compound and is substantially composed of a single component with a purity of 95 wt % or more; it may a mixture of isomers or it may be a material that should be designated as a dihydroxy resin having a molecular weight distribution. However, since a polymer resulting from the reaction with an aromatic diglycidyl compound needs to crystallize, an aromatic dihydroxy compound itself preferably has a structure that shows excellent symmetry and causes minimal steric hindrance.

An aromatic dihydroxy compound may be an aromatic dihydroxy resin terminated with hydroxyl groups at both ends as represented by the following general formula (5) if circumstances require; the said resin is obtained by the reaction of an aromatic dihydroxy compound having a lower molecular weight than the target aromatic dihydroxy compound with epichlorohydrin or with an aromatic diglycidyl compound and it has a molecular weight distribution. In the following account of the synthesis of the aforementioned aromatic dihydroxy resin terminated with hydroxyl groups at both ends, an aromatic dihydroxy compound and an aromatic diglycidyl compound are respectively referred to as a dihydroxy compound and a diglycidyl compound.

(5)

In general formula (5), B is a divalent group, one B may be identical with or different from another B, and m is a number of 0 or more.

The reaction of a dihydroxy compound with epichlorohydrin can be carried out, for example, by using 1 mole or less of epichlorohydrin per 1 mole of the hydroxyl group in the dihydroxy compound in the presence of an alkali metal hydroxide.

The dihydroxy compound here is preferably the same as the one used in the synthesis of the aforementioned aromatic diglycidyl compound.

The aforementioned aromatic dihydroxy resin can also be synthesized by the reaction of the same raw material dihydroxy compound as the one used for the aromatic diglycidyl compound with a diglycidyl compound whose main component is a compound represented by the aforementioned general formula (4) wherein n is 0. In this case, the molar ratio of the two reactants is controlled so that 1 mole of the hydroxyl group in the dihydroxy compound reacts with 1 mole or less, preferably 0.1 to 0.9 mole, more preferably 0.2 to 0.6 mole, of the glycidyl group in the diglycidyl compound.

In general formula (5), m is a nonnegative integer and the value of m can be controlled easily by changing the molar ratio of epichlorohydrin or a diglycidyl compound to a dihydroxy compound in the reaction. The mean value of m is preferably in the range of 0.1 to 10.0. A mean value larger than this raises the viscosity and makes handling of the compound more difficult.

The hydroxyl equivalent of an aromatic dihydroxy compound, preferably an aromatic dihydroxy compound represented by general formula (5), to be used for the production of a crystalline resin cured product according to this invention is normally in the range of 100 to 40,000. In applications to laminated sheets and the like, the hydroxyl equivalent is preferably in the range of 120 to 20,000 from the viewpoint of providing film-forming ability and flexibility. On the other hand, in applications to molding materials, the hydroxyl equivalent is preferably in the range of 120 to 1,000 from the viewpoint of securing packing of fillers at high content and good moldability. In the case where two kinds or more of aromatic dihydroxy compounds are used together, it is preferable for the said compounds to satisfy the aforementioned criteria for the hydroxyl equivalent. In this case, the hydroxyl equivalent is computed by dividing the total weight in grams of the compounds by the number of moles of the hydroxyl groups in them.

It is advantageous for an aromatic diglycidyl compound or an aromatic dihydroxy compound to be used for the production of a crystalline resin cured product to contain a unit represented by the aforementioned general formula (3). In general formula (3), X is a linking group selected from a direct linkage, a methylene linkage, and oxygen and n is an integer of 1 to 3.

The crystalline resin cured product of this invention is not necessarily required to have a crosslinked structure, but a three-dimensional structure is desirable from the viewpoint of improving heat stability and mechanical properties. A procedure useful for forming a three-dimensional structure consists of using an aromatic dihydroxy compound together with an epoxy resin curing agent other than the said aromatic dihydroxy compound in the reaction with an aromatic diglycidyl compound to the extent that this procedure does not damage the crystallinity of the target crystalline resin cured product. Such epoxy resin curing agents include dicyandiamide, imidazoles, amines, acid anhydrides, phenols, polymercaptans, polyaminoamides, isocyanates, and blocked isocyanates. These curing agents contain three or more functional groups or have an ability to expedite the reaction of the glycidyl group with the hydroxyl group of a secondary alcohol formed by the reaction of a glycidyl group with a hydroxyl group and they contribute to the formation of a three-dimensional structure.

Concretely, the amine-based curing agents include aliphatic amines, polyetherpolyamines, alicyclic amines, and aromatic amines. The aromatic amines are preferred and their examples include tetrachloro-p-xylenediamine, m-xylenediamine, p-xylenediamine, m-phenylenediamine, p-phenylenediamine, 4,4'-diaminodiphenylmethane, 4,4'-diamino-1,2-diphenylethane, 4,4'-diaminodiphenyl sulfone, diaminodiethyldimethyldiphenylmethane, and α,α'-bis(aminophenyl)-p-diisopropylbenzene.

Examples of the acid anhydride-based curing agents include phthalic anhydride, trimellitic anhydride, pyromellitic dianhydride, benzophenonetetracarboxylic acid dianhydride, 3,3',4,4'-diphenylsulfonetetracarboxylic acid dianhydride, and 3,3',4,4'-diphenylethertetracarboxylic acid dianhydride.

Examples of the phenol-based curing agents include phenol novolak, naphthol novolak, o-cresol novolak, phenol aralkyl resins, naphthol aralkyl resins, and phenol aralkyl resins having a biphenyl structure.

The kind and the amount of these compounds are selected in consideration of the degree of crystallinity and properties of the target crystalline resin cured product. However, from the viewpoint of securing high degree of crystallinity, the use of an aromatic diamine compound is preferred. Examples of the aromatic diamines include m-phenylenediamine, p-phenylenediamine, 4,4'-diaminodiphenylmethane, 4,4'-diamino-1,2-diphenylethane, 4,4'-diaminodiphenyl sulfone, diaminodiethyldimethyldiphenylmethane, and α,α'-bis(aminophenyl)-p-diisopropylbenzene.

The aromatic amine is normally used at a rate of 2 to 100 parts by weight, preferably 5 to 50 parts by weight, per 100 parts by weight of the aromatic diglycidyl compound. An amount more than the upper limit lowers the degree of crystallinity of the product polymer while an amount less than the lower limit reduces the effect for improving the heat stability and the like.

The aromatic diglycidyl compound and the aromatic dihydroxy compound are normally mixed at a rate of 0.8 to 1.2 moles, preferably 0.9 to 1.1 moles, more preferably 0.95 to 1.05 moles, of the hydroxyl group in the dihydroxy compound per 1 mole of the glycidyl groups in the aromatic diglycidyl compound in the case where no epoxy resin curing agent other than the aromatic dihydroxy compound is used. In the case where an epoxy resin curing agent other than the aromatic dihydroxy compound is incorporated, the number of moles of the functional groups in both the aromatic dihydroxy compound and the epoxy curing agent is controlled to fall in the aforementioned range.

From the standpoint of improving fluidity during molding and adhesion to a variety of substrates, a thermoplastic oligomer may be added during the production of a crystalline resin cured product according to this invention. Examples of the thermoplastic oligomer include C5 and C9 petroleum resins, styrene resins, indene resins, indene-styrene copolymers, indene-styrene-phenol copolymers, indene-coumarone copolymers, and indene-benzothiophene copolymers. The addition is normally made at a rate of 2 to 30 parts by weight of the oligomer per 100 parts by weight of the aromatic diglycidyl compound.

If necessary, it is allowable to use flame retardants such as brominated epoxy compounds and phosphorus-containing epoxy compounds, mold release agents such as carnauba wax and ester wax, coupling agents such as epoxysilanes, aminosilanes, ureidosilanes, vinylsilanes, alkylsilanes, organic titanates, and aluminum alcoholates, colorants such as carbon black, auxiliary flame retardants such as antimony trioxide, stress-lowering agents such as silicone oils, and lubricants such as higher fatty acids and metal salts of higher fatty acids.

According to this invention, a crystalline resin composite material is produced by combining a crystalline resin cure product with a filler or base material, the latter accounting for 10 to 90 wt % of the total weight of the composite material. Examples of the filler or base material (hereinafter either may be referred to as filler) include metals, metal oxides, metal nitrides, metal carbides, metal hydroxides, powders such as carbonaceous materials, fibers such as glass fibers, aramid fibers, polyester fibers, carbon fibers, and metal wires, and filmy materials such as polyimide films, polyamideimide films, copper foils, and stainless steel foils. The metals include silver, copper, gold, platinum, and zirconium; the metal oxides include silica, aluminum oxide, magnesium oxide, titanium oxide, and tungsten trioxide; the metal nitrides include boron nitride, aluminum nitride, and silicon nitride; the metal carbides include silicon carbide; the metal hydroxides include aluminum hydroxide and magnesium hydroxide; the carbonaceous materials include carbon fibers, graphitized carbon fibers, natural graphite, artificial graphite, spherical graphite particles, mesocarbon microbeads, carbon whiskers, carbon microcoils, carbon nanocoils, carbon nanotubes, and carbon nanohones. These fillers may be incorporated singly or as a mixture of two kinds or more. The fillers may be treated with coupling agents in the usual manner to improve the wettability between the filler and the crystalline resin cured product, to reinforce the interface between the filler and the crystalline resin cured product, and to improve dispersion of the filler in the crystalline resin cured product. An inorganic filler in the form of particles or powders or a base material in the form of fibers or cloth is preferred as a filler or base material.

According to this invention, a crystalline resin composite material can be produced by mixing an aromatic diglycidyl compound, an aromatic dihydroxy compound, and a filler, preferably an inorganic filler, and thermally curing the mixture. Advantageously, an aromatic diglycidyl compound is allowed to react preliminarily with an aromatic dihydroxy compound to give a crystalline resin intermediate product, the intermediate product is combined with the aforementioned filler, and the combined mass is cured. The crystalline resin intermediate product here is an oligomer resulting from a partial reaction of the aromatic diglycidyl compound with the aromatic dihydroxy compound and it can be dissolved in a solvent or melted by heating like a thermoplastic material. The molecular weight of the crystalline resin intermediate product is not limited and it is usually in the range of 500 to 5,000.

Alternatively, the crystalline resin intermediate product is melt-mixed with a filler by heating without using an organic solvent or the crystalline resin intermediate product is dissolved in an organic solvent and the resulting varnish is combined with a filler. In the case where the crystalline resin intermediate product is combined with a sheet of fibers as a base material, a particularly useful method consists of impregnating a sheet made of glass fibers, aramid fibers, polyester fibers, carbon fibers, or metal wires with the varnish prepared from the crystalline resin intermediate product, drying the impregnated sheet to form a prepreg, and molding the prepreg by heating in a press. In the case where the base material is a film or a sheet such as a copper foil, an aluminum foil, a stainless steel foil, a liquid crystal polymer film, a polyamide film, and a polyimide film, the varnish prepared from the crystalline resin intermediate product is cast on the base material and thermally cured and dried to yield the target crystalline resin composite material.

The organic solvent useful in the aforementioned case include aromatic hydrocarbons such as benzene, toluene, xylene, and chlorobenzene, ketones such as acetone, methyl ethyl ketone, methyl isobutyl ketone, cyclopentanone, and cyclohexanone, aliphatic hydrocarbons such as hexane, butane, and methylcyclohexane, alcohols such as ethanol, isopropanol, butanol, and ethylene glycol, ethers such as diethyl ether, dioxane, tetrahydrofuran, and diethylene glycol dimethyl ether, and polar solvents such as N,N-dimethylformamide, N,N-dimethylacetamide, dimethyl sulfoxide, and N-methylpyrrolidone.

A method relevant to the production of the crystalline resin composite material of this invention consists of combining an aromatic diglycidyl compound, an aromatic dihydroxy compound, and a filler, and allowing the combined mass to react to form a crystalline resin composite material. This method differs from the conventional method which consists of combining a liquid crystal polymer of high molecular weight with a filler as described in the patent documents 5 and 6 and elsewhere. According to this invention, an aromatic diglycidyl compound and an aromatic dihydroxy compound are combined with a filler before the two compounds react to give a product of increased molar mass and this enables one to perform the combining operation in the state of low viscosity. In consequence, it becomes possible to increase the content of a filler sharply and the product manifests excellent properties characteristic of a crystalline resin composite material. A procedure suitable for applying this method consists of melt mixing an aromatic diglycidyl compound, an aromatic dihydroxy compound, and a filler without a solvent and molding the melt in a compression molding machine, a transfer molding machine, or an injection molding machine thereby allowing the aromatic diglycidyl compound to react with the aromatic dihydroxy compound to give a crystalline polymer. In this case, the molding temperature is normally in the range of 60 to 250° C., but it is desirable to carry out the reaction at a low temperature in order to raise the degree of crystallinity of a crystalline polymer and the temperature suitable for this purpose is 80° C. or above. To be specific, the temperature is preferably in the range of 80 to 180° C., more preferably in the range of 100 to 160° C. The molding time ranges from 1 minute to 3 hours, preferably from 2 minutes to 1 hour. Postcure may be performed after molding. The postcure temperature is normally in the range of 130 to 250° C. and the postcure time is normally in the range of 1 to 24 hours. However, it is desirable to perform postcure at a temperature lower than the endothermic peak temperature in differential thermal analysis by 5 to 60° C. for a time in the range of 1 to 24 hours.

In the aforementioned production of a crystalline resin composite material, an aromatic diglycidyl compound, an aromatic dihydroxy compound, and a filler are combined and the combined mass is heated to allow the two compounds to react to form a crystalline resin and allow the crystal resin being formed to combine with the filler to give a crystalline resin composite material. Alternatively, a varnish is made from an aromatic diglycidyl compound, an aromatic dihydroxy compound, and an organic solvent, a base material composed of a sheet of fibers (such as woven cloth and nonwoven cloth) is impregnated with the varnish and then dried by heating to give a prepreg, and the prepreg is heated in a press thereby allowing the two compounds to form a crystalline resin and allowing the resin being formed to combine with the sheet of fibers to give a crystalline resin composite material. In this case, a powdered filler may be added in advance to the varnish containing the aromatic diglycidyl compound and the aromatic dihydroxy compound.

The resin phase composed of the aforementioned crystalline resin cured product constitutes the matrix phase in the composite material of this invention. The desirable properties of this crystalline resin cured product and the method for its production are as described above.

EXAMPLES

This invention will be described in detail below with reference to the examples related to this invention.

Synthetic Example 1

In 3690 g of epichlorohydrin was dissolved 576 g of 4,4'-dihydroxydiphenyl ether and to the solution was added dropwise 48% sodium hydroxide solution under reduced pressure (at approximately 120 mmHg) at 60° C. over 4 hours. In the meantime, the water formed was removed from the system by azeotropic distillation with epichlorohydrin and the distilled epichlorohydrin was returned to the system. Upon completion of the dropwise addition, the reaction was continued for 1 hour. Thereafter, the epichlorohydrin was distilled off under reduced pressure, the remainder was dissolved in 2090 g of methyl isobutyl ketone, and the salt formed was removed by filtration. Then, 68 g of 20% sodium hydroxide solution was added and the reaction was allowed to proceed at 80° C. for 2 hours. The reaction mixture was filtered, washed with water, and stripped of the solvent methyl isobutyl ketone by distillation under reduced pressure to give 825 g of a diglycidyl resin (diglycidyl resin A) as light yellow crystals. The diglycidyl resin shows an epoxy equivalent of 163 g/eq., a hydrolyzable chlorine content of 280 ppm, a melting point of 78-84° C., and a viscosity of 0.0062 Pa·s at 150° C. The content of hydrolyzable chlorine was determined by dissolving 0.5 g of a sample in 30 ml of dioxane, adding 10 ml of 1N KOH solution, boiling the mixture under reflux for 30 minutes, cooling the mixture to room temperature, adding 100 ml of 80% acetone water, and conducting potentiometric titration with 0.002N $AgNO_3$ solution. The melting point was determined by the capillary method at a rate of temperature rise of 2° C./min.

Synthetic Example 2

In a 500-ml four-necked flask equipped with a stirrer, a thermometer, a condenser, and a gas inlet tube for nitrogen were placed 245 g of diglycidyl resin A prepared in Synthetic Example 1 and 38 g of 4,4'-dihydroxydiphenyl ether and melt-mixed with stirring at 150° C. in a stream of nitrogen, 0.12 g of triphenylphosphine was added, and the mixture was allowed to react for 2 hours to give 281 g of a diglycidyl resin. The diglycidyl resin (diglycidyl resin B) thus obtained crystallized when allowed to cool to room temperature. The resin showed an epoxy equivalent of 261 g/eq., a melting point of 100-122° C. determined by the capillary method, and a viscosity of 0.037 Pa·s at 150° C. The ratio of the resin components in terms of the ratio of n in general formula (1) was determined by GPC measurements: n=0, 45.8%; n=2, 28.0%; n=4, 12.3%; and n≥6, 13.9%. The viscosity was measured with the aid of Rheomat 115, a viscometer manufactured by Contraves Industrial Products, Ltd. The GPC measurements were made as follows: apparatus, HLC-82A manufactured by Tosoh Corporation; columns, TSK-GEL2000×3 and TSK- GEL4000×1 manufactured by Tosoh Corporation; solvent, tetrahyrofuran; flow rate, 1 ml/min; temperature, 38° C.; detector, RI.

Synthetic Example 3

In 3240 g of epichlorohydrin and 650 g of diethylene glycol dimethyl ether was dissolved 500 g of 4,4'-dihydroxydiphenylmethane and to the solution was added dropwise 48% sodium hydroxide solution under reduced pressure (at approximately 120 mmHg) at 60° C. over 4 hours. In the meantime, the water formed was removed from the system by azeotropic distillation with epichlorohydrin and the distilled epichlorohydrin was returned to the system. Upon completion of the dropwise addition, the reaction was continued for 1 hour. Thereafter, the epichlorohydrin and the diethylene glycol dimethyl ether were distilled off under reduced pressure, the remainder was dissolved in 1800 g of methyl isobutyl ketone, and the salt formed was removed by filtration. Then, 60 g of 20% sodium hydroxide solution was added to the filtrate and the mixture was allowed to react at 80° C. for 2 hours. The reaction mixture was then filtered, washed with water, and stripped of the methyl isobutyl ketone by distillation under reduced pressure to give 714 g of a diglycidyl resin (diglycidyl resin C) as light yellow crystals. The resin showed an epoxy equivalent of 160.5 g/eq., a hydrolyzable chlorine content of 360 ppm, a melting point of 53-62° C. determined by the capillary method, and a viscosity of 0.0030 Pa·s at 150° C.

Synthetic Example 4

In a 500-ml four-necked flask equipped with a stirrer, a thermometer, a condenser, and a gas inlet tube for nitrogen were placed 241 g of diglycidyl resin C prepared in Synthetic Example 3 and 50 g of 4,4'-dihydroxydiphenylmethane and melt-mixed with stirring at 150° C. in a stream of nitrogen, 0.14 g of n-butyltriphenylphosphonium bromide was added, and the mixture was allowed to react for 2 hours to give 285 g of a diglycidyl resin. The diglycidyl resin (diglycidyl resin D) was allowed to cool to room temperature. The resin was then kneaded with application of shear thereby causing the resin to crystallize. The diglycidyl resin thus obtained showed an epoxy equivalent of 303 g/eq., a melting point of 114-120° C. determined by the capillary method, and a viscosity of 0.0595 Pa·s at 150° C. The ratio of the resin components in terms of the ratio of n in general formula (1) was determined by GPC measurements: n=0, 27.6%; n=2, 26.3%; n=4, 15.0%; and n≥6, 22.2%.

Example 1

Figure 1:
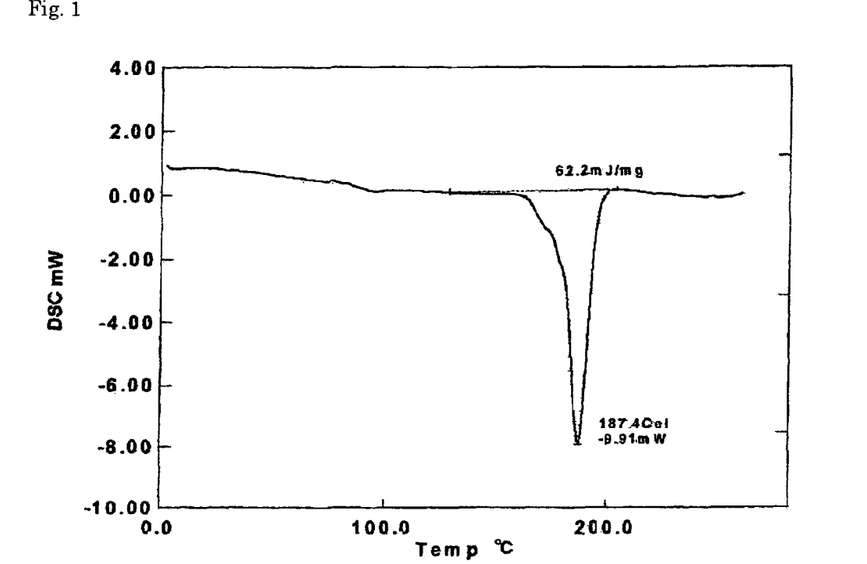
FIG. 1 is a DSC chart of an article molded from the crystalline resin cured product.
Figure 2:
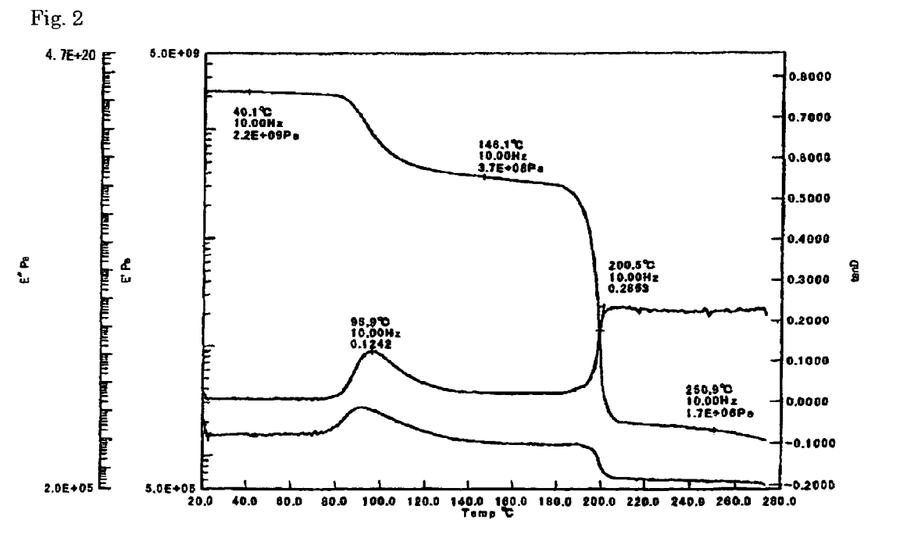
FIG. 2 is a chart showing the results of measurement of the kinetic viscoelasticity of an article molded from the crystalline resin cured product.

A resin composition was prepared by melt mixing 163 g of diglycidyl resin A obtained in Synthetic Example 1 as an aromatic diglycidyl component and 101 g of 4,4'-dihydroxydiphenyl ether as an aromatic dihydroxy component at 120° C. and then mixing the melt with 0.26 g of 2-ethyl-4-methylimidazole homogeneously. The resin composition thus prepared was poured into a mold and heated at 150° C. for 12 hours to give a crystalline molded article which was completely opaque and colored light yellowish white. The molded article, when analyzed by differential scanning calorimetry, showed an endothermic peak attributable to the melting point of the crystals at 187.4° C. and absorbed a heat quantity of 62.2 J/g. The DSC chart thereby obtained is shown in FIG. 1. The results of measurement of the kinetic viscoelasticity of the molded article are shown in FIG. 2. As the temperature was raised, a peak in tan δ was observed at 95.9° C. corresponding to the glass transition temperature of the molded article. Due to high crystallinity of the molded article, the modulus of elasticity was maintained at a high level even when the temperature was raised past the glass transition temperature and then a sharp drop in the storage elastic modulus was observed near 190° C. accompanying the melting of the crystals. Thereafter, the molded article did not melt to show fluidity even when the temperature was raised above the melting point and this confirms an occurrence of three-dimensional crosslinking. Further, the molded article became optically isotropic and transmitted light at a temperature above the melting point in correspondence to a loss of the crystal phase at that temperature. The kinetic viscoelasticity was determined with DMS6100, an instrument manufactured by Seiko Instruments Inc., at a frequency of 10 Hz and at a rate of temperature rise of 2° C./min.

Example 2

Figure 3:
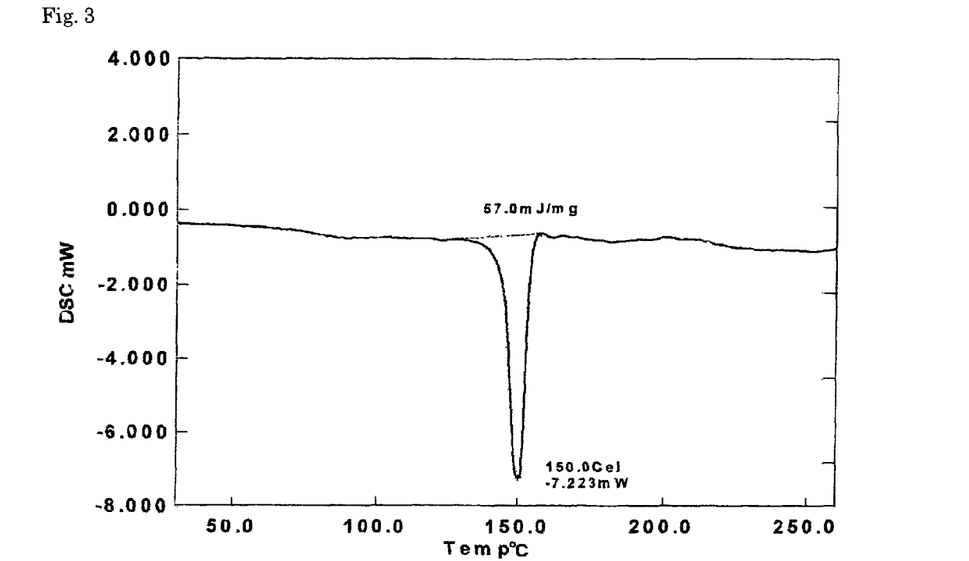
FIG. 3 is a DSC chart of an article molded from the crystalline resin cured product.

A resin composition was prepared by melt mixing 160.5 g of diglycidyl resin C obtained in Synthetic Example 3 as an aromatic diglycidyl component and 100.0 g of 4,4'-dihydroxydiphenylmethane as an aromatic dihydroxy component at 120° C. and mixing the melt with 1.04 g of triphenylphosphine homogeneously. The resin composition thus prepared was poured into a mold and heated at 100° C. for 12 hours to give a crystalline molded article which was completely opaque and colored light yellowish white. When analyzed by differential scanning calorimetry, the molded article showed an endothermic peak attributable to the melting point of the crystals at 150.0° C. and absorbed a heat quantity of 57.0 J/g. The DSC chart thereby obtained is shown in FIG. 3. The molded article became optically isotropic and transmitted light at a temperature above the melting point in correspondence to a loss of the crystal phase at the temperature.

Example 3

Figure 4:
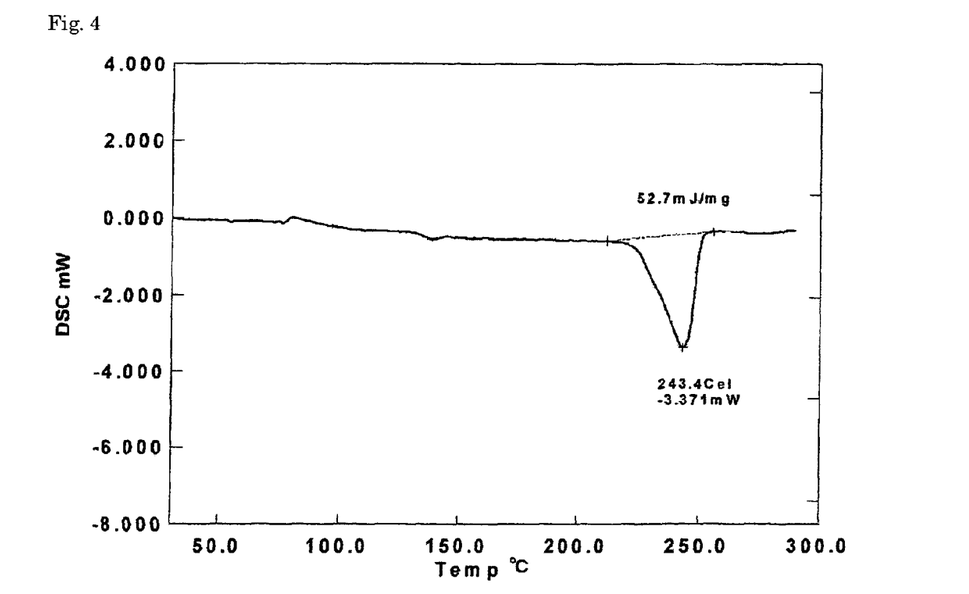
FIG. 4 is a DSC chart of an article molded from the crystalline resin cured product.

A resin composition was prepared by melt mixing 163 g of diglycidyl resin A obtained in Synthetic Example 1 as an aromatic diglycidyl component and 93 g of 4,4'-dihydroxybiphenyl as an aromatic dihydroxy component at 170° C. and mixing the melt with 0.26 g of 2-ethyl-4-methylimidazole homogeneously. The resin composition was then heated at 200° C. for 1 hour to give a crystalline molded article which was completely opaque and colored light yellowish white. When analyzed by differential scanning calorimetry, the molded article showed an endothermic peak attributable to the melting point of the crystals at 243.4° C. and absorbed a heat quantity of 52.7 J/g. The DSC chart thereby obtained is shown in FIG. 4. The molded article became optically isotropic and transmitted light at a temperature above the melting point in correspondence to a loss of the crystal phase at the temperature.

Example 4

A resin composition was prepared by powder mixing 18.5 g of diglycidyl resin A obtained in Synthetic Example 1, 11.5 g of 4,4'-dihydroxydiphenyl ether as an aromatic dihydroxy component, 0.18 g of 2-methylimidazole as a curing accelerator, and 169.8 g of alumina and then melt kneading the mixture in a heating roll at 120° C. The resin composition was cured at 150° C. and then postcured at 150° C. for 12 hours and the molded article thus obtained was submitted to the tests for a variety of properties. The glass transition temperature (Tg) and the coefficient of linear thermal expansion (CTE) were determined with a thermomechanical analyzer, Model TMA120C manufactured by Seiko Instruments Inc., at a rate of temperature rise of 10° C./min. The heat distortion temperature (HDT) was determined with a heat distortion tester, Model HD-500 manufactured by Yasuda Seiki Seisakusho Ltd. at a rate of temperature rise of 2° C./min. The thermal conductivity (HCR) was determined with a thermal conductivity tester, Model HC-110 manufactured by Eko Instruments Co., Ltd. using a disk-shaped sample which was 50 mm in diameter and 3 mm in thickness. The water absorption (WAR) was determined by allowing a disk-shaped molded article, 50 mm in diameter and 3 mm in thickness, to absorb water at 85° C. and 85% RH for 100 hours. All the results are shown together in Table 1.

Example 5

A molded article was produced as in Example 4 with the exception of using 21.7 g of diglycidyl resin B obtained in Synthetic Example 2 and 6.6 g of 4,4'-dihydroxydiphenyl ether and 1.7 g of 4,4'-dihydroxybiphenyl as a dihydroxy component and tested for the properties.

Example 6

A molded article was produced as in Example 4 with the exception of using 22.6 g of diglycidyl resin D obtained in Synthetic Example 4 and 5.9 g of 4,4'-dihydroxydiphenyl ether and 1.5 g of 4,4'-dihydroxybiphenyl as a dihydroxy component and tested for the properties.

Example 7

A molded article was produced as in Example 4 with the exception of using 18.8 g of diglycidyl resin A obtained in Synthetic Example 1, 10.1 g of 4,4'-dihydroxydiphenyl ether as a dihydroxy component, and 1.1 g of 4,4'-diaminodiphenyl sulfone and tested for the properties.

Example 8

A molded article was produced as in Example 4 with the exception of using 19.6 g of diglycidyl resin A obtained in Synthetic Example 1, 6.2 g of 4,4'-dihydroxydiphenyl ether as a dihydroxy component, and 4.2 g of 4,4'-diaminodiphenyl sulfone and tested for the properties.

Comparative Example 1

A molded article was produced as in Example 4 with the exception of using 18.4 g of glycidyl resin A obtained in Synthetic Example 1 and 11.6 g of phenol novolak resin (PSM-4261 manufactured by Gun Ei Chemical Industry Co., Ltd.: OH equivalent, 103 g/eq.; softening point, 80° C.) as a curing agent and tested for the properties.

Comparative Example 2

A molded article was produced as in Example 4 with the exception of using 19.3 g of bisphenol A type epoxy resin (YD-128 manufactured by Tohto Kasei Co., Ltd.; epoxy equivalent, 186 g/eq.) as a diglycidyl component and 10.7 g of phenol novolak resin (PSM-4261) as a curing agent and tested for the properties.

Comparative Example 3

A molded article was produced as in Example 4 with the exception of using 19.6 g of biphenyl type epoxy resin (YX-4000H manufactured by Japan Epoxy Resins Co., Ltd.; epoxy equivalent, 195 g/eq.) as a diglycidyl component and 10.4 g of phenol novolak resin (PSM-4261) as a curing agent and tested for the properties. The results are shown in Table 1 wherein m.p. stands for melting point and HM for heat of melting.

TABLE 1

|  | Example | | | | | Comparative Example | | |
| --- | --- | --- | --- | --- | --- | --- | --- | --- |
|  | 4 | 5 | 6 | 7 | 8 | 1 | 2 | 3 |
| Tg (° C.) | 96 | 101 | 89 | 98 | 124 | 131 | 117 | 124 |
| CTE (ppm, <Tg) | 11 | 11 | 12 | 11 | 12 | 16 | 17 | 17 |
| CTE (ppm, >Tg) | 51 | 53 | 55 | 54 | 56 | 68 | 67 | 66 |
| HDT(° C.) | 183 | 175 | 160 | 173 | 186 | 132 | 123 | 132 |
| WAR(wt %) | 0.10 | 0.11 | 0.11 | 0.12 | 0.14 | 0.23 | 0.21 | 0.20 |
| HCR(W/m · K) | 5.7 | 6.2 | 5.4 | 5.2 | 4.8 | 3.1 | 2.7 | 2.9 |
| m.p.(° C.) | 189 | 178 | 161 | 169 | 191 | None | None | None |
| HM (J/g-resin) | 102 | 86 | 73 | 65 | 38 | 0 | 0 | 0 |

INDUSTRIAL APPLICABILITY

Unlike the production of hitherto known epoxy resins having a rigid mesogenic main chain or liquid crystal polymers having a rigid main chain, a resin of high crystallinity can be produced without need of a special operation such as orientation and application of magnetic field according to this invention. The resin can be combined easily with inorganic fillers and this makes it possible, for example, to design composite materials having excellent properties such as high thermal conductivity. Composite materials produced by combining the resin with a base material composed of inorganic fibers such as glass cloth are applicable to substrates for printed wiring boards in automobile instrument panels, substrates for power supply units in household appliances, and high-density integrated circuit packages in personal computers and servers. Furthermore, composite materials produced by combining the resin with an inorganic filler such as silica and alumina can be molded and are suited for applications requiring high thermal conductivity such as encapsulants for semiconductors, substrates for heat sinks, and the like. Still further, the composite materials manifest a high degree of crystallinity and, when used as materials for molding, conversion into films and sheets, and lamination, they show high thermal conductivity, low thermal expansion, high heat resistance, low moisture absorption, and good gas barrier properties.

The invention claimed is:

1. A crystalline resin cured product which is characterized in that the crystalline resin cured product contains a unit formed by the reaction of an aromatic diglycidyl compound with an aromatic dihydroxy compound and represented by the following general formula (2) in an amount of 50 wt % or more of the whole, and has a distinct melting point due to growth of the crystal domain, softens at a temperature above its melting point as the result of a loss of the crystal phase, and has a heat distortion temperature without clearly showing fluidity and, when analyzed by differential scanning calorimetry, the crystalline resin cured product absorbs a heat quantity of 10 J/g or more calculated on the basis of the resin components of the crystalline resin cured product as the crystals of the crystalline resin cured product melt and the endothermic peak appears in the range of 120 to 320° C., the reaction is performed at a temperature that is in the range of 60 to 250° C. and lower than the melting point of the crystalline resin cured product by 10 to 100° C.:

(2)

in general formula (2), A and B are divalent aromatic groups and they may be identical with or different from each other and wherein the aromatic diglycidyl compound and the aromatic dihydroxy compound are mixed in a ratio of 0.8 to 1.2 moles of the hydroxyl groups in the dihydroxy compound per 1 mole of the glycidyl groups in the aromatic diglycidyl compound;

and wherein the aromatic diglycidyl compound or the aromatic dihydroxy compound or both contain a unit represented by the following general formula (3):

(3)

in general formula (3), X is a linking group selected from a direct linkage and an ether linkage and n is an integer of 1 to 3.

2. A crystalline resin cured product as described in claim 1 wherein the main component of the crystalline resin cured product is obtained by the reaction of an aromatic diglycidyl compound with an aromatic dihydroxy compound.

3. A crystalline resin cured product as described in claim 2 wherein the aromatic diglycidyl compound or the aromatic dihydroxy compound have one kind or more of units selected from a 4,4'-diphenyl ether group, a 4,4'-diphenyl sulfide group, a 4,4'-diphenylmethane group, a 1,4-phenylene group, a 4,4'-biphenylene group, a 1,5-naphthylene group, a 2,6-naphthylene group, and a 9,10-anthracenylene group, the units being optionally substituted with a methyl group or a halogen atom or both.

4. A crystalline resin composite material comprising a filler or base material wherein the crystalline resin cured product described in claim 1 constitutes the matrix resin of the crystalline resin composite material.

5. A crystalline resin composite material as described in claim 4 wherein the filler or base material accounts for 10 to 90 wt % of the total weight.

6. A crystalline resin composite material as described in claim 4 wherein the heat distortion temperature falls in the range ±30° C. from the melting point of the crystalline resin cured product.

7. A crystalline resin cured product as described in claim 1 wherein the product has a structure formed by further using an epoxy resin curing agent other than the aromatic dihydroxy compound in the reaction with the aromatic diglycidyl compound.

8. A crystalline resin cured product as described in claim 7 wherein the aromatic diglycidyl compound and the aromatic dihydroxy compound are mixed in a ratio of 0.8 to 1.2 moles of the total hydroxyl groups in the dihydroxy compound and the epoxy curing agent per 1 mole of the glycidyl groups in the aromatic diglycidyl compound.

9. A crystalline resin cured product as described in claim 7 wherein the epoxy resin curing agent comprises an aromatic dihydroxy compound and an amine.

10. A crystalline resin cured product as described in claim 1 wherein the aromatic diglycidyl compound and the aromatic dihydroxy compound both contain a unit represented by formula (3).

11. A crystalline resin cured product as described in claim 1 wherein an epoxy resin curing catalyst is further used in the reaction of the aromatic diglycidyl compound and the dihydroxy compound.

* * * * *